(12) United States Patent
Baek

(10) Patent No.: US 9,184,434 B2
(45) Date of Patent: Nov. 10, 2015

(54) BATTERY PACK

(75) Inventor: Woon-Seong Baek, Yongin-si (KR)

(73) Assignee: Samsung SDI Co., Ltd., Yongin-si (KR)

(*) Notice: Subject to any disclaimer, the term of this patent is extended or adjusted under 35 U.S.C. 154(b) by 302 days.

(21) Appl. No.: 12/897,684

(22) Filed: Oct. 4, 2010

(65) Prior Publication Data

US 2011/0135969 A1 Jun. 9, 2011

(30) Foreign Application Priority Data

Dec. 4, 2009 (KR) .................. 10-2009-0119781

(51) Int. Cl.
*H01M 2/02* (2006.01)
*H01M 2/34* (2006.01)
*H01M 10/42* (2006.01)

(52) U.S. Cl.
CPC .............. *H01M 2/34* (2013.01); *H01M 2/0215* (2013.01); *H01M 10/425* (2013.01)

(58) Field of Classification Search
CPC .... H01M 2/0215; H01M 2/34; H01M 10/425
USPC .................................................. 429/7, 96–100
See application file for complete search history.

(56) References Cited

U.S. PATENT DOCUMENTS

| 6,357,534 | B1* | 3/2002 | Buetow et al. .............. 173/217 |
| 2005/0112415 | A1* | 5/2005 | Takeshita et al. ............. 429/7 |
| 2006/0266542 | A1* | 11/2006 | Yoon ........................... 174/112 |
| 2009/0029241 | A1* | 1/2009 | Moon ........................... 429/100 |
| 2009/0111018 | A1 | 4/2009 | Park et al. |

FOREIGN PATENT DOCUMENTS

| JP | 2005-044575 | 2/2005 |
| JP | 2005-142153 | 6/2005 |
| KR | 10-2006-0036822 | 5/2006 |
| KR | 10-2006-0100891 | 9/2006 |
| KR | 10-0686860 | 2/2007 |
| KR | 10-2009-0043917 | 5/2009 |
| KR | 10-2009-0075396 | 7/2009 |

OTHER PUBLICATIONS

KIPO Office action for Korean priority Patent Application No. 10-2009-0119781, dated Apr. 26, 2011, 3 pages.
KIPO Notice of Allowance dated Nov. 28, 2011, for Korean priority Patent application 10-2009-0119781, noting references previously submitted in an IDS dated Jun. 29, 2011, 1 page.

* cited by examiner

*Primary Examiner* — Miriam Stagg
*Assistant Examiner* — Brent Thomas
(74) *Attorney, Agent, or Firm* — Christie, Parker & Hale, LLP

(57) ABSTRACT

A battery pack including a bare cell; a protection circuit module electrically coupled to the bare cell; an outer frame accommodating the bare cell and the protection circuit module, wherein a first surface of a first side of the outer frame contacts the protection circuit module; and a first projection on a second surface of the first side of the outer frame opposite to the first surface.

12 Claims, 3 Drawing Sheets

BATTERY PACK

CROSS-REFERENCE TO RELATED APPLICATION

This application claims priority to and the benefit of Korean Patent Application No. 10-2009-0119781, filed on Dec. 4, 2009, in the Korean Intellectual Property Office, the entire content of which is incorporated herein by reference.

BACKGROUND

1. Field

One or more embodiments of the present invention relate to a battery pack.

2. Description of Related Art

As the development and demand of mobile devices have recently been increased, demands on secondary batteries as energy sources have been rapidly increased. Among these secondary batteries, many studies for lithium secondary batteries have been conducted. Currently, lithium secondary batteries are commercialized and widely used.

Battery packs are generally classified into a hard battery pack and an inner battery pack based on how the secondary battery is mounted to a case. Since the hard battery pack forms a part of the external shape of an electronic device on which it is mounted, it is easy to mount the hard battery pack on the electronic device in its use. However, since a case is necessarily designed suitable for the kind of the electronic device in the state that a bare cell is mounted in the hard pack, the hard pack is relatively high priced, and the compatibility of the hard pack is low.

On the other hand, since the inner pack is mounted in the electronic device and then covered by a cover that forms a part of the electronic device, its mounting is relatively complicated. However, the inner pack is easily designed and inexpensive, and the compatibility of the inner pack is high.

In general, an inner battery pack includes a chargeable/dischargeable bare cell; a protection circuit module electrically connected to the bare cell to control the charge/discharge of the bare cell; a resin filled in the gap between the bare cell and the protection circuit module; and an outer frame molded in a shape attachable to an electronic device by packing the bare cell, the protection module and the resin therein.

In order to manufacture and assemble such a battery pack, a lead is connected to a positive electrode, and a positive temperature coefficient (PTC) thermistor is connected to a negative electrode. In this state, the protection circuit module is electrically connected to the lead and the PTC thermistor. Subsequently, a protection circuit module and a bare cell are mechanically fixed to each other by filling a resin into the gap between the protection circuit module and the bare cell so that the protection circuit module is not separated from the bare cell. Then, the bare cell and the protection circuit module, formed in a single body, are packed using an outer frame having a shape attachable to an electronic device. Here, the outer frame is integrally formed with the bare cell, the protection circuit module and the resin by molding them with another resin.

Subsequently, the battery pack may inserted into the electronic device to supply power to the electronic device. However, over time a gap may be produced between the battery pack and the electronic device, and therefore, the battery pack may be easily separated or dislodged from the electronic device. Further, when the battery pack is reversely inserted into the electronic device, malfunction may occur or the electronic device may not operate.

SUMMARY

In one embodiment, there is provided a battery pack capable of preventing or reducing the likelihood of its reverse insertion and capable of being stably fixed to an electronic device.

According to an aspect of the present invention, a battery pack is provided including a bare cell; a protection circuit module electrically coupled to the bare cell; an outer frame accommodating the bare cell and the protection circuit module wherein a first surface of a first side of the outer frame contacts the protection circuit module; and a first projection on a second surface of the first side of the outer frame opposite to the first surface.

In one embodiment, the first projection is rounded and may protrude in a generally semicircular shape from the outer frame, may be made of an elastic material, and may be fixed to the outer frame by an adhesive. Alternatively, the outer frame may have a cavity, and the first projection is fixedly inserted into the cavity.

Additionally, the battery pack may also include an additional first projection on the second surface of the outer frame, wherein each of the first projections is within a middle half of a length of the second surface of the outer frame.

In one embodiment, the battery pack may include at least one cavity for preventing reverse insertion of the battery pack into an electronic device adapted to receive the battery pack.

Further, the battery pack may include a second projection having a substantially rectangular shape and provides a gripping surface to allow the battery pack to be removed from an electronic device to which the battery pack is attached.

BRIEF DESCRIPTION OF THE DRAWINGS

The accompanying drawings, together with the specification, illustrate exemplary embodiments of the present invention, and, together with the description, serve to explain the principles of the present invention.

DETAILED DESCRIPTION

Figure 1:
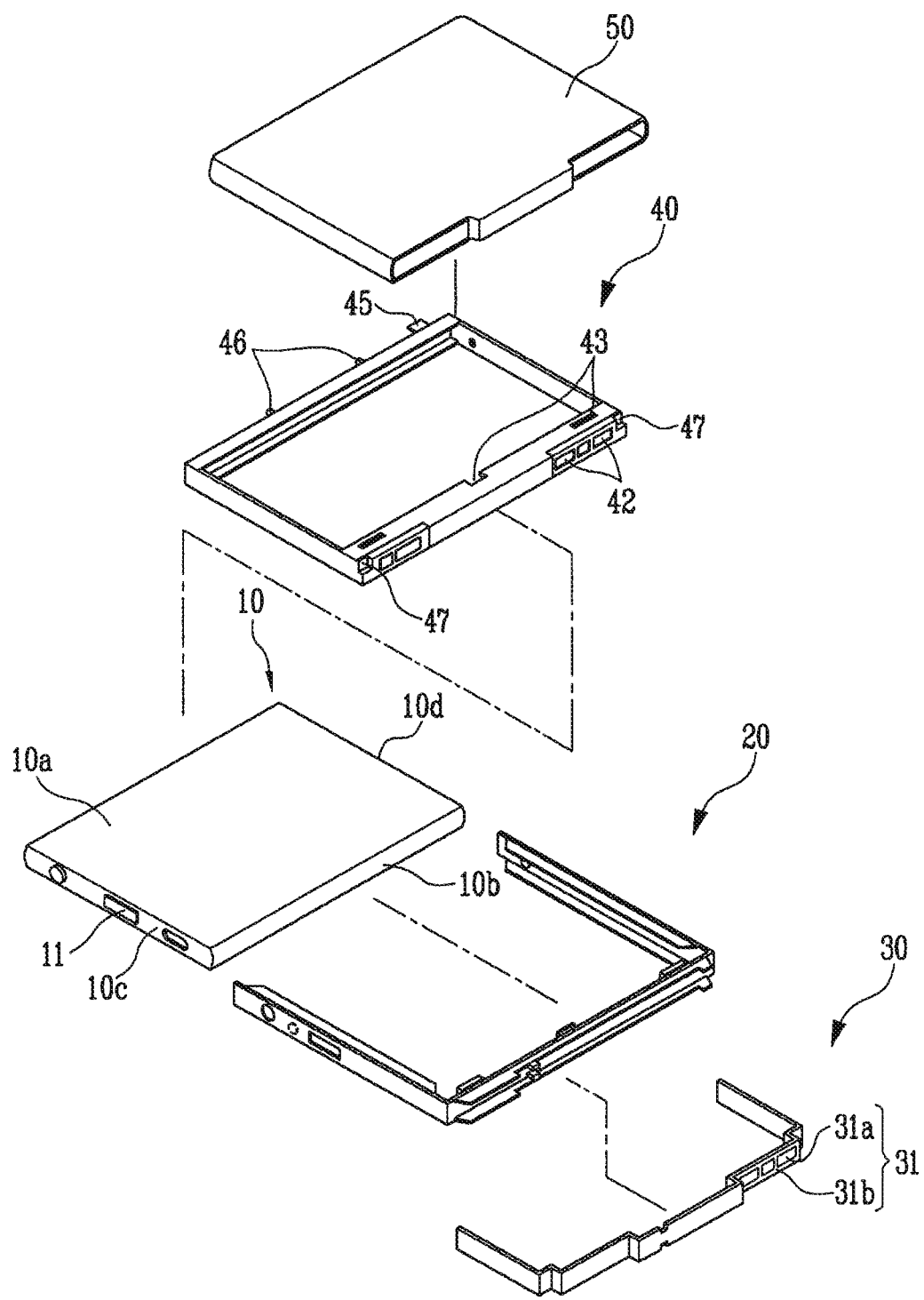
FIG. 1 is an exploded perspective view of a battery pack according to an embodiment of the present invention.

In the following detailed description, only certain exemplary embodiments of the present invention have been shown and described, simply by way of illustration. As those skilled in the art would realize, the described embodiments may be modified in various different ways, all without departing from the spirit or scope of the present invention. Accordingly, the drawings and description are to be regarded as illustrative in nature and not restrictive. In addition, when an element is referred to as being "on" another element, it can be directly on the another element or be indirectly on the another element with one or more intervening elements interposed therebetween. Also, when an element is referred to as being "connected to" another element, it can be directly connected to the another element or be indirectly connected to the another element with one or more intervening elements interposed therebetween. Hereinafter, like reference numerals refer to like elements.

FIG. 1 is an exploded perspective view of a battery pack according to an embodiment of the present invention.

Referring to FIG. 1, the battery pack according to this embodiment includes a bare cell 10 having an electrode assembly and a can and pouch for surrounding the outer circumferential surface of the electrode assembly; a protection circuit module 30 electrically connected to the bare cell 10; an inner frame 20; and an outer frame 40.

The bare cell 10 has a pair of long-side surfaces 10a opposite to each other, a pair of short-side surfaces 10b opposite to each other while being connected to ends of the long-side surfaces 10a, an upper surface 10c and a lower surface 10d. The bare cell 10 also has an electrode terminal 11 exposed to one side thereof.

The bare cell 10 includes an electrode assembly and a can (or pouch) for accommodating the electrode assembly. The electrode assembly has a positive electrode plate, a separator and a negative electrode plate. In one embodiment, a positive electrode active material is coated on both surfaces of the positive electrode plate, and a negative electrode active material is coated on both surfaces of the negative electrode plate. The positive and negative electrode plates are joined with electrode tabs, respectively. One of the electrode tabs is connected to the can or a cap plate, and the other of the electrode tabs is connected to an electrode terminal 11.

The inner frame 20 is connected to one short-side surface 10b of the bare cell 10. The protection circuit module 30 is seated on the outside or exterior-facing surface of the inner frame 20. In one embodiment, the inner frame 20 and the protection circuit module 30 may be attached to each other by welding or insulation tape. Meanwhile, it has been illustrated in FIG. 1 that the inner frame 20 is formed in a '⊏' or a "square C" shape. However, the present invention is not limited thereto. Rather, in embodiments of the present invention, the inner frame 20 may be selected to be any one of various shapes known in the art. If necessary, the inner frame 20 may be omitted.

The outer frame 40 is formed in a substantially rectangular shape to accommodate the bare cell 10, the inner frame 20 and the protection circuit module 30. As such, holes or openings 43 are formed at the outer frame 40, and the outer frame 40 is connected to the inner frame 20 at the holes 43.

A terminal exposing portion 42 is formed on one surface of a first surface of a first side of the outer frame 40, the terminal exposing portion being a portion of the outer frame 40 generally proximate where the outer frame comes in contact with the protection circuit module 30 so that a terminal portion 31 of the protection circuit module 30 can be exposed. Cavities 47 are respectively formed at both ends of one surface of the outer frame 40. When the battery pack is inserted into an electronic device, the cavities 47 prevent or significantly reduce the likelihood that the battery pack will be reversely or backwardly inserted into the electronic device. For example, a connection body connected to each of the cavities 47 is formed at the electronic device. Accordingly, the battery pack is inserted into the electronic device so that the cavity 47 is connected to the connection body, thereby preventing reverse insertion.

Figure 2:
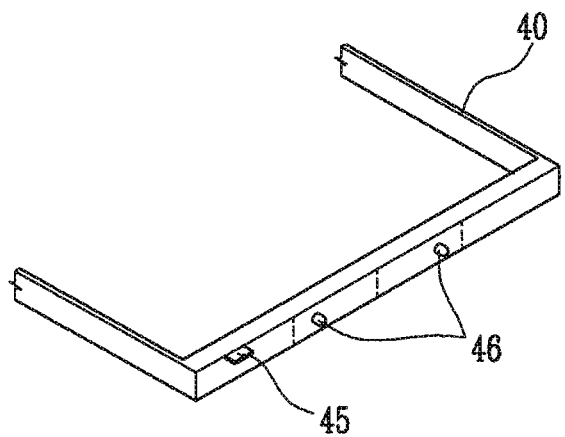
FIG. 2 is a perspective view illustrating a portion of an outer frame illustrated in FIG. 1.

As illustrated in FIG. 2, first projections 46 and a second projection 45 are formed on one surface of the outer frame 40. In one embodiment, the projections 45, 46 are on the surface of the outer frame 40 opposite to the side facing the bare cell 10, i.e., the exterior-facing surface.

The second projection 45 is protruded in a rectangular shape from an upper portion of the other side of the outer frame 40. The second projection 45 serves as a support so that the battery pack can be easily separated and removed from the electronic device after it is inserted into the electronic device. For example, a user can separate the battery pack from the electronic device while pulling the second projection 45 upward. The second projection 45 may be integrally formed with the outer frame 40 when forming the outer frame 40.

One or more first projections 46 are formed at the other side of the outer frame 40. The first projections 46 are formed of an elastic material (e.g., rubber), and provide a predetermined support force (bias force) so that the battery pack is not easily separated from the electronic device when it is inserted into the electronic device. In one embodiment, the first projections 46 are formed to be rounded. For example, the first projections 46 are formed to protrude in a semicircular shape from the outer frame 40.

In one embodiment, two first projections 46 are formed at the outer frame 40. When the side of the outer frame 40 is divided into four equal regions, the first projections 46 may be positioned within the second and third regions (i.e., the middle regions) of the side of the outer frame 40, so that the battery pack is stably inserted into the electronic device. However, it will be understood that the present invention is not limited to these locations for the first projections 46.

Figure 3A:
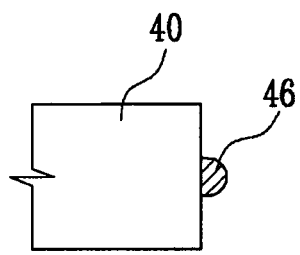
FIGS. 3A and 3B are views illustrating a first projection illustrated in FIG. 2.
Figure 3B:
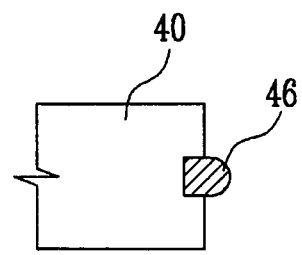

As noted above, the first projections 46 formed of the elastic material are fixed to the outer frame 40. For example, as illustrated in FIG. 3A, the first projections 46 may be fixed to the outer frame 40 by an adhesive material. Alternatively, as illustrated in FIG. 3B, the first projections 46 may be fixedly inserted into a cavity formed in the outer frame 40.

The first projection 46 is formed to protrude by about 0.2 to about 0.4 mm from the outer frame 40. When the first projection 46 is formed to protrude by less than 0.2 mm, the battery pack may be too easily separated from the electronic device by a gap formed over time between the battery pack and the electronic device. When the first projection 46 is formed to protrude by more than 0.4 mm, the battery pack may be too difficult to be inserted into the electronic device.

The protection circuit module 30 is electrically connected to the electrode terminal 11 of the bare cell 10, and includes a printed circuit board (PCB). A protection circuit is formed on the PCB that allows the charge state of a battery to be uniform by controlling the charge and discharge of the battery. The protection circuit module 30 may include protection elements such as a thermistor and a temperature fuse. The protection elements prevent dangers such as explosion and firing of the battery by cutting off current when the voltage or current of the battery exceeds a regulated voltage or current due to the high temperature or overcharge/overdischarge of the battery. The protection circuit module 30 may include an electrical connection terminal formed so that the electrode tabs of the bare cell 10 are electrically connected to the PCB.

The protection circuit module 30 is used to transmit and receive electrical signals between the bare cell 10 and the electronic device. The protection circuit module 30 includes an external input/output terminal portion 31 that serves as an electrical medium with the electronic device. The external input/output terminal portion 31 includes metal portions 31a and a housing portion 31b that surrounds the metal portions 31a. The metal portions 31a are plated with a conductive material, such as gold (Au) so that electrical signals are communicated between the bare cell 10 and the electronic device. The housing portion 31b is formed of a plastic material that is an insulative material so that the metal portions 31a located at a predetermined interval in the housing portion 31b are isolated from one another. The protection circuit module 30 is attached to the outside of the inner frame 20 by welding or insulation tape. If the inner frame 20 is omitted, the protection circuit module 30 may be fixed by a resin filled between the protection circuit module 30 and the bare cell 10.

A taping member 50 is used to reinforce the connection of the outer frame 40 with the bare cell 10, the inner frame 20 and the protection circuit module 30 (hereinafter, the bare cell 10, the inner frame 20 and the protection circuit module 30 are referred to as a "core pack" for convenience of illustration). The taping member 50 may be formed in a shape that locally surrounds only the connection portion between the outer frame 40 and the core pack. Alternatively, the taping member 50 may be formed in the shape of a single sheet that surrounds the entire outer surface of the outer frame 40 and the core pack. As will be appreciated, the shape of the taping member 50 is not limited thereto. However, the shape of the taping member 50 is configured so that the second projection 45 and the first projections 46 are exposed.

Figure 4:
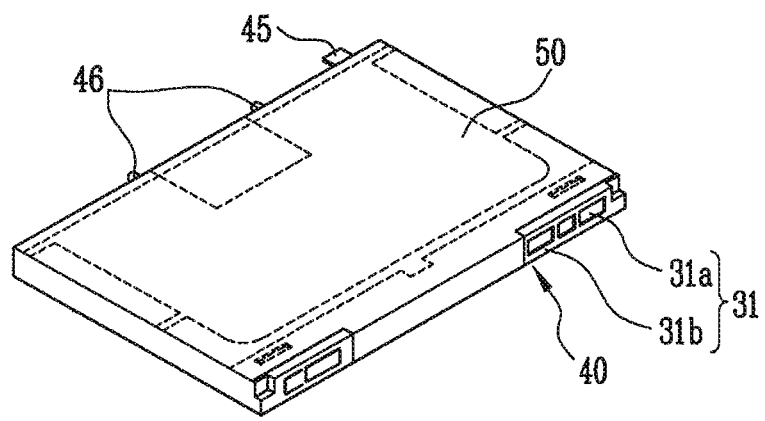
FIGS. 4 and 5 are perspective views of the battery pack according to the embodiment of the present invention.
Figure 5:
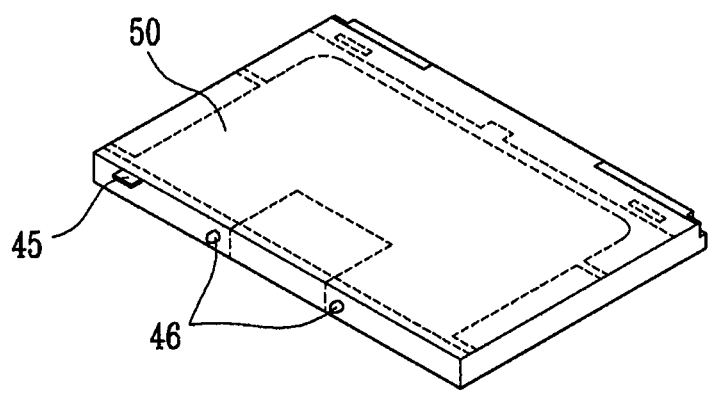

FIGS. 4 and 5 are perspective views of the battery pack according to the embodiment of the present invention.

Referring to FIGS. 4 and 5, after the outer frame 40 is inserted into the core pack, the taping member 50 is formed to surround the outside of the outer frame 40 and the core pack. Here, the outer input/output terminal 31 is exposed to a first surface of a first side of the outer frame 40. The external input/output terminal portion 31 is electrically connected to the electronic device into which it is inserted.

The second projection 45 and the first projections 46 are exposed to the other side of the outer frame 40. The second projection 45 serves as a support so that a user can easily separate the battery pack from the electronic device if a sufficient amount of force is applied. The first projections 46 are formed of an elastic material that is rounded so that the electronic device and the battery pack are not easily separated or dislodged from each other.

While the present invention has been described in connection with certain exemplary embodiments, it is to be understood that the invention is not limited to the disclosed embodiments, but, on the contrary, is intended to cover various modifications and equivalent arrangements included within the spirit and scope of the appended claims, and equivalents thereof.

What is claimed is:

1. A battery pack comprising:
a bare cell;
a protection circuit module electrically coupled to the bare cell;
an inner frame directly contacting the protection circuit module and at least two sides of the bare cell;
an outer frame separable from the inner frame, the outer frame being entirely continuous and entirely surrounding the bare cell, the protection circuit module and the inner frame, wherein a first surface of a first side of the outer frame contacts the protection circuit module; and
a first projection on a second surface of the first side of the outer frame opposite to the first surface, wherein the first projection comprises an elastic material,
further comprising a second projection on the second surface of the outer frame, and
wherein the second projection has a substantially rectangular shape and provides a gripping surface to allow the battery pack to be removed from an electronic device to which the battery pack is attached.

2. The battery pack according to claim 1, wherein the first projection is rounded.

3. The battery pack according to claim 2, wherein the first projection protrudes in a generally semicircular shape from the outer frame.

4. The battery pack according to claim 1, wherein the first projection protrudes by about 0.2 to about 0.4 mm from the outer frame.

5. The battery pack according to claim 1, further comprising an additional first projection on the second surface of the outer frame, and wherein each of the first projections is within a middle half of a length of the second surface of the outer frame.

6. The battery pack according to claim 1, wherein the first projection is fixed to the outer frame by an adhesive.

7. The battery pack according to claim 1, wherein the outer frame has a cavity, and wherein the first projection is fixedly inserted into the cavity.

8. The battery pack according to claim 1, further comprising at least one cavity for preventing reverse insertion of the battery pack into an electronic device adapted to receive the battery pack.

9. The battery pack according to claim 1, wherein the inner frame is between the bare cell and the protection circuit module.

10. The battery pack according to claim 1, further comprising a taping member fixed to an exterior of the bare cell and the outer frame.

11. The battery pack according to claim 1, wherein the second surface of the first side of the outer frame is an exterior-facing surface.

12. The battery pack according to claim 1, wherein the outer frame has a substantially rectangular shape.

* * * * *